(12) United States Patent
Nagel et al.

(10) Patent No.: US 7,085,456 B1
(45) Date of Patent: Aug. 1, 2006

(54) ELECTRICAL AND OPTICAL ISOLATING UNIT FOR AN UNDERSEA BRANCHING UNIT

(75) Inventors: Jonathan A. Nagel, Brooklyn, NY (US); Stephen G. Evangelides, Jr., Red Bank, NJ (US)

(73) Assignee: Red Sky Subsea Ltd., Essex (GB)

( * ) Notice: Subject to any disclaimer, the term of this patent is extended or adjusted under 35 U.S.C. 154(b) by 0 days.

(21) Appl. No.: 10/971,537

(22) Filed: Oct. 22, 2004

(51) Int. Cl.
*G02B 6/44* (2006.01)
(52) U.S. Cl. ...................... 385/100; 385/135
(58) Field of Classification Search ............. 385/135
See application file for complete search history.

(56) References Cited

U.S. PATENT DOCUMENTS

| | | | |
|---|---|---|---|
| 5,838,477 A * | 11/1998 | Yamamoto et al. | 398/105 |
| 6,115,516 A * | 9/2000 | Watson et al. | 385/24 |
| 6,160,222 A * | 12/2000 | Claverie | 174/93 |
| 6,377,373 B1 * | 4/2002 | Kawazawa et al. | 398/82 |
| 6,809,934 B1 * | 10/2004 | Takeda et al. | 361/752 |
| 6,895,187 B1 * | 5/2005 | Webb | 398/104 |
| 6,934,442 B1 * | 8/2005 | Nagel et al. | 385/24 |
| 2003/0198027 A1 * | 10/2003 | Takeda et al. | 361/728 |
| 2005/0084207 A1 * | 4/2005 | Nagel et al. | 385/24 |

OTHER PUBLICATIONS

Chesnoy, J. (editor) et al. "Terminal Equipment". Undersea Fiber Communication Systems. Academic Press. Chapter 10 pp. 337-410. 2002.

* cited by examiner

*Primary Examiner*—Sung Pak
(74) *Attorney, Agent, or Firm*—Mayer & Williams PC; Stuart H. Mayer, Esq.

(57) ABSTRACT

An optical and electrical isolating unit for use with a branching unit located in an undersea optical transmission system is provided. The unit includes a pressure vessel adapted for use in an undersea environment. First, second and third ports are located in the pressure vessel for receiving first, second and third undersea transmission cables, respectively. The first cable includes an electrical power conductor and at least one optical fiber. The second cable includes an electrical conductor, and the third cable, which is electrically unpowered, includes at least one optical fiber. An electrical power conductor segment is provided for electrically coupling the conductor in the first cable received in the first port to the conductor in the second cable received in the second port. At least one optical fiber segment is located in the pressure vessel, which segment optically couples the optical fiber of the first cable to the optical fiber of the third cable.

10 Claims, 5 Drawing Sheets

ELECTRICAL AND OPTICAL ISOLATING UNIT FOR AN UNDERSEA BRANCHING UNIT

STATEMENT OF RELATED APPLICATIONS

This application is related to co-pending U.S. patent application Ser. No. 10/687,544, filed on Oct. 16, 2003, and entitled "Undersea Branching Unit For An Undersea Optical Transmission System," which is incorporated by reference herein in its entirety.

FIELD OF THE INVENTION

The present invention relates generally to undersea or submarine branching units for an undersea optical transmission system, and more particularly to an undersea branching unit that does not require electrical power to be rerouted in the event of a cable fault.

BACKGROUND OF THE INVENTION

Undersea optical communication systems include land-based terminals containing transmitters and receivers connected by a cabled-fiber-transmission medium that includes periodically spaced repeaters, which contain optical amplifiers whose purpose is to compensate for the optical attenuation in the cabled-fiber. As the repeaters are usually placed undersea and away from power sources, power must be supplied remotely to the repeaters. The cabled-fiber therefore usually contains a copper conductor to carry electrical power to the repeaters from the terminals. These undersea systems serve to carry optical communication signals (i.e., traffic) between the terminals. The traffic on these systems can consist of voice, data, television, Internet traffic, international telephone traffic, etc. Consequently, the revenue lost when the system is down can be significant. Therefore, these systems must have high reliability and availability.

To provide increased flexibility in undersea network architecture beyond simple point-to-point interconnection between land-based terminals, a branching unit is provided, which allows traffic to be split or switched to/from multiple landing points. Conventional branching units typically manage the cabled-fiber interconnections and the power conductor paths among three cables. The latter is necessary to maintain as much traffic carrying capability when a fault occurs in one of the three cable legs, which increases the availability of the system. FIG. 1 shows a simplified schematic diagram of a conventional branching unit 10. The branching unit 10 is a three port device in which each of the ports 12, 14 and 16 receive a cabled-fiber 20, 22, and 24, respectively. Each of the cabled-fibers 20, 22, and 24 includes one or more optical fibers 26 and an electrical power conductor 28. Cabled-fibers 20 and 22 are generally referred to as trunks and cabled-fiber 24 is generally referred to as a branch. Branching unit 10 can drop incoming traffic on trunks 20 and/or trunk 22 to branch 24 and add traffic from branch 24 to trunks 20 and/or trunk 22.

A power-switched branching unit such as shown in FIG. 1 is generally configured to allow re-routing of electrical power from the terminals in the presence of a fault in one of the cables, so that two of the three cable legs in a branched system can still be powered. Such a power-switched branching unit usually has three operating states: normal, alternate-normal, and grounded-trunk. The power-switched branching unit can be configured in any of these three states by the appropriate power-up sequencing from the terminals of the three legs. The reconfiguration of the branching unit is typically performed by a relatively complex series of relays, which significantly adds to the cost and complexity of the device.

Co-pending U.S. patent application Ser. No. 10/687,544 discloses a simplified branching unit in which electrical power is only provided to two of its legs. The third leg employs a cable that does not incorporate an electrical conductor and hence serves as an unrepeatered leg. Because only two legs are powered instead of three, the complex power-switching arrangement required in conventional branching units may be eliminated. FIG. 2 shows a simplified schematic diagram of the branching unit 30 depicted in the aforementioned patent application. The branching unit 30 is a three port device in which each of the ports 46, 47 and 48 receive a cabled-fiber 32, 34 and 44 respectively. Cabled-fibers 32 and 34 serve as cable trunks that each includes one or more optical fibers 40 and an electrical power conductor 38. Cabled-fiber 44 includes one or more optical fibers 36 and, as shown, does not include an electrical conductor.

While the aforementioned branching unit is sufficient when one leg, the branch, is unrepeatered, it would be desirable to provide an adjunct device for use in connection with the branching unit that allows the branch to be repeatered when so desired.

SUMMARY OF THE INVENTION

In accordance with the present invention, an optical and electrical isolating unit for use in an undersea optical transmission system includes a pressure vessel adapted for use in an undersea environment. First, second and third ports are located in the pressure vessel for receiving first, second and third undersea transmission cables, respectively. The first cable includes an electrical power conductor and at least one optical fiber. The second cable includes an electrical conductor, and the third cable, which is electrically unpowered, includes at least one optical fiber. An electrical power conductor segment is provided for electrically coupling the conductor in the first cable received in the first port to the conductor in the second cable received in the second port. At least one optical fiber segment is located in the pressure vessel, which segment optically couples the optical fiber of the first cable to the optical fiber of the third cable.

In accordance with one aspect of the invention, at least one optical amplifier is located along the optical fiber segment for optically amplifying optical signals traveling therethrough.

In accordance with another aspect of the invention, the optical fiber of the third cable includes at least one drop optical fiber and at least one add optical fiber.

In accordance with another aspect of the invention, the optical fiber of the first and second cables each comprise a plurality of optical fibers and the optical fiber segment comprises a plurality of optical fiber segments. Each of the optical fiber segments optically couple one of the plurality of optical fibers of the first cable to one of the plurality of optical fibers of the third cable.

In accordance with another aspect of the invention, a plurality of optical amplifiers is respectively located along the plurality of optical fiber segments for optically amplifying optical signals respectively traveling therethrough.

In accordance with another aspect of the invention, the electrical conductor of the second cable is connected to sea ground.

In accordance with another aspect of the invention, a branching unit is provided for interconnecting at least three undersea optical transmission cables. The branching unit includes a branching device having a first pressure vessel adapted for use in an undersea environment. First and second ports are located in the first pressure vessel for receiving first and second undersea, electrically powered, optical transmission cables. A third port is located in the first pressure vessel for receiving a third, electrically unpowered, optical transmission cable. The branching unit also includes an optical and electrical isolating unit having a second pressure vessel in which fourth and fifth ports are located for receiving a fourth undersea, electrically powered, optical transmission cable and a fifth electrically powered transmission cable, respectively. A sixth port is located in the second pressure vessel for receiving an end of said third, electrically unpowered optical transmission cable remote from the third port of the branching device. An electrical power conductor segment is located in the second pressure vessel for electrically coupling an electrical power conductor in the fourth cable received in the fourth port to an electrical power conductor in the fifth cable received in the fifth port. At least one optical fiber segment is located in the second pressure vessel optically coupling at least one optical fiber of the third cable to at least one optical fiber of the fourth cable.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
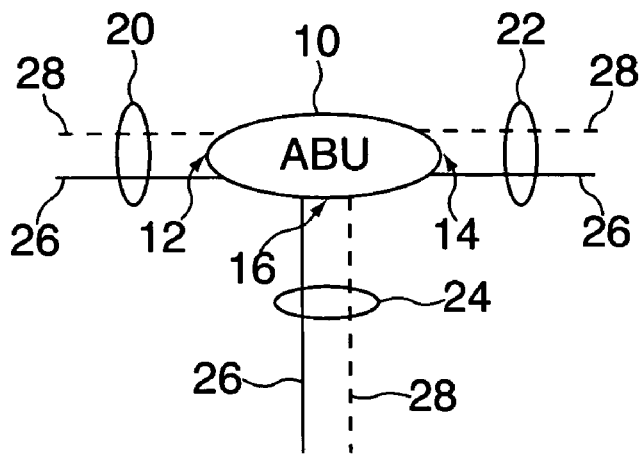
FIG. 1 shows a simplified schematic diagram of a conventional branching unit.

As discussed in more detail below, the present invention provides an optical and electrical isolating unit that can be used in connection with the branching unit depicted in FIG. 2 to provide a branching unit in which all three legs can be repeatered. The optical and electrical isolating unit is a three port device in which a transmission cable is received in one port, the electrical conductor of which is directed to a second of the ports, and the optical fiber or fibers of which are directed to the third of the ports. When properly interconnected with the branching unit in the manner discussed below, the combination of the branching unit and the optical and electrical isolating unit serves as a fully featured branching unit in which all three legs can be electrically powered. Moreover, this functionality is achieved without the need for a complex electrical relay arrangement that is employed by a conventional power-switched branching unit such as discussed in connection with FIG. 1.

Figure 2:
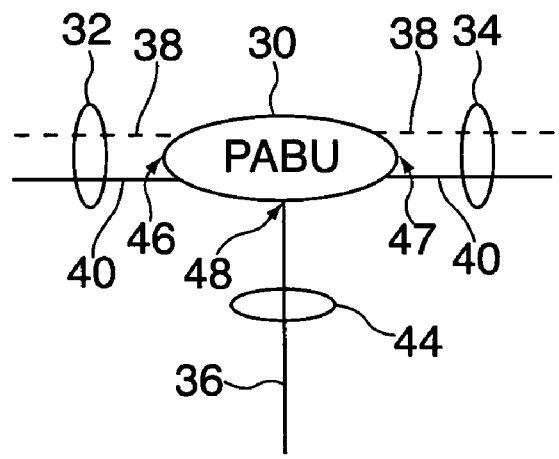
FIG. 2 shows a branching unit that may be used in connection with the present invention.
Figure 3:
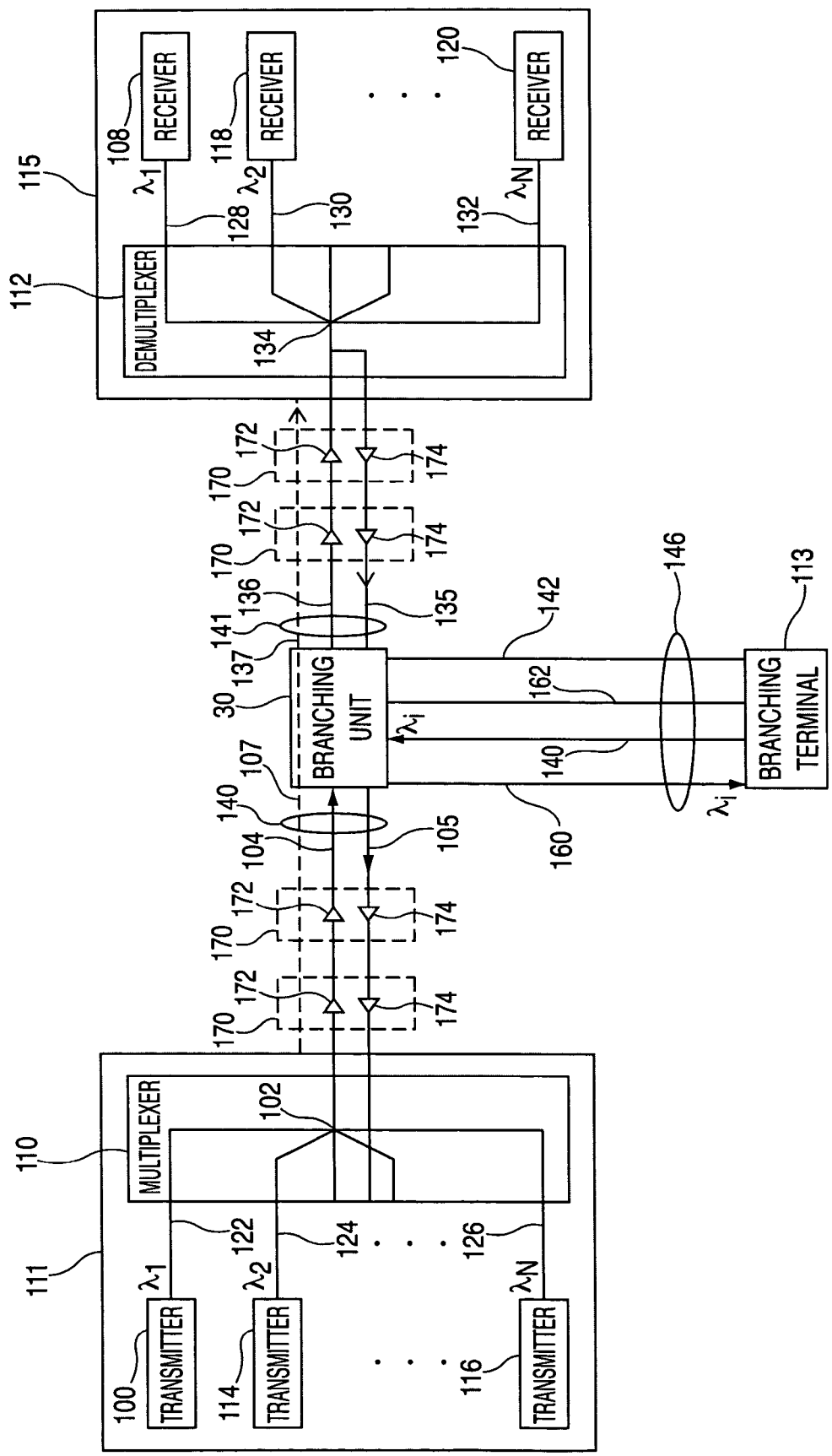
FIG. 3 illustrates a block diagram of a trunk and branch undersea WDM optical transmission system in which the branching unit of FIG. 2 may be employed.

FIG. 3 illustrates a block diagram of a trunk and branch undersea WDM optical transmission system in which the branching unit 30 of FIG. 2 may be employed. The network includes transmission trunk terminal 111 and receiver trunk terminal 115 interconnected by cable trunks 140 and 141. Cable trunk 140 includes electrical conductor 107 and optical fibers 104 and 105, which support bi-directional optical communication. Likewise, cable trunk 141 includes electrical conductor 137 and optical fibers 136 and 135, which also support bidirectional communication. Repeaters 170 are located along trunks 140 and 141. Each repeater 170 includes a pair of optical amplifiers 172 and 174. Optical amplifier 172 provides amplification to signals traveling along optical fibers 104 and 136 and optical amplifier 174 provides amplification to signals traveling along optical fibers 105 and 135. The network also includes branching unit 30 and branch terminal 113. Branch terminal 113 includes transmitters and receivers (not shown) similar to trunk terminals 111 and 115. Branching unit 30 is of the type shown in FIG. 2 and disposed in the transmission path between trunk terminals 111 and 115. Cabled-fiber 146 of branching unit 30 includes four optical fibers 160, 140, 162 and 142 instead of the single optical fiber seen in FIG. 2. Branching unit 30 directs selected wavelengths to branch terminal 113 over branch cable 146. While trunk cables 140 and 141 may be repeatered, branch cable 146 is unrepeatered.

As shown, trunk terminal 111 includes optical communication transmitters 100, 114 and 116 to transmit optical communications channels at wavelength $\lambda_1$, $\lambda_2$ . . . $\lambda_N$, respectively. Multiplexer 110 multiplexes these signals together to form multiplexed signal 102. Multiplexed signal 102 is launched into optical fiber 104 for transmission to the receiving end. Since optical fiber 104 serves as a high-capacity trunk, signal 102 is also referred to as "trunk traffic". During transmission, multiplexed signal 102 passes through branching unit 30. Branching unit 30 places multiplexed signal 102 back onto optical fiber 136 of the trunk cable 142. At the receiving trunk terminal 115, demultiplexer 112 demultiplexes and routes $\lambda_1$, $\lambda_2$ . . . N to receivers 108, 118 . . . 120, respectively.

Branching unit 30 places wavelength $\lambda_i$ on optical fiber 160 of branch cable 146 and thereby branches $\lambda_i$ to branch terminal 113. The optical information signal of wavelength $\lambda_i$ is referred to as "branch traffic," since branching unit 30 branches it from trunk fiber 104 to branch fiber 160. Branch terminal 113 in turn transmits a different optical information signal at wavelength $\lambda_i$ onto optical fiber 140. Branching unit 30 replaces $\lambda_i$, which was dropped onto optical fiber 160, with the $\lambda_i$ it receives from branch terminal 113 on optical fiber 140. The branch unit 30 multiplexes this $\lambda_i$ with $\lambda_1, \lambda_2 \ldots \lambda_n$, forming multiplexed optical signal 134, which is launched on optical fiber 136 toward receiving trunk terminal 115. Optical fibers 162 and 142 are used to add and drop traffic from terminal 115 in a manner similar to that described above for terminal 111.

It is worthy to note that multiplexed signal 134 is different from multiplexed signal 102 since the optical information signal of wavelength $\lambda_i$ has been replaced with a different optical information signal of wavelength $\lambda_i$. That is, although multiplexed signal 102 and 134 may include the same signal wavelengths, they do not necessarily carry the same information.

Of course, as previously mentioned, one limitation of the branching unit 30 is that since it does not include any provision for an electrical conductor on cable branch 146, cable branch 146 is unrepeatered. The present invention allows branch cable 146 to be repeatered while still employing the branching unit 30 depicted in FIG. 2 rather than the power-switched branching unit depicted in FIG. 1. This is accomplished with the device shown in FIG. 4.

Figure 4:
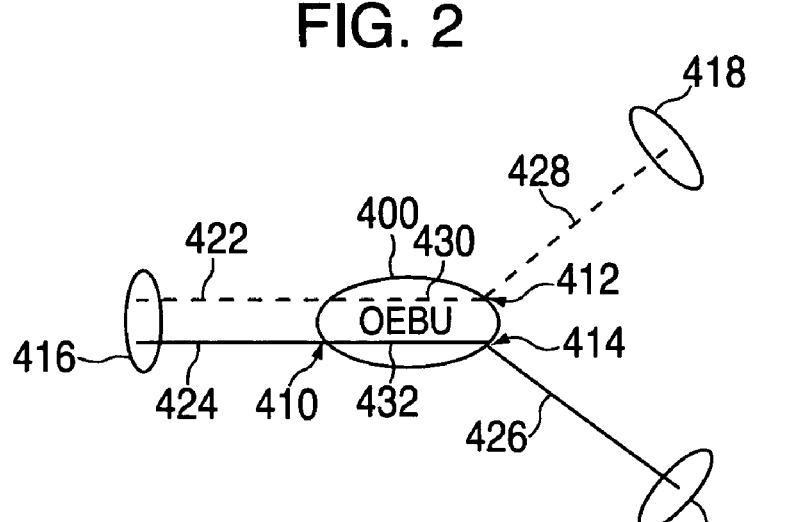
FIG. 4 shows one embodiment of an optical and electrical isolating unit constructed in accordance with the present invention.

FIG. 4 shows an optical and electrical isolating unit 400 in accordance with the present invention. As those of ordinary skill in the art will recognize, the device is housed in a suitable pressure vessel that can reliably withstand the undersea environment for an extended period of time (e.g., 25 years). Optical and electrical isolating unit 400 is a three port device that includes ports 410, 412 and 414. Port 410 receives an undersea cabled-fiber 416 that includes both electrical conductor 422 and one or more optical fibers 424. Port 414 receives an undersea cable-fiber 420 than includes one or more optical fibers 426, but no electrical conductors. Port 412 receives an undersea cable 418 that only includes an electrical conductor 428 and thus does not include any optical fibers. The isolating unit 400 also includes an electric power conductor segment 430 that electrically connects the conductor 422 in cable-fiber 416 when received in port 410 to the conductor 428 in cable 418 when received in port 412. The isolating unit 400 also includes one or more optical fiber segments 432 that each optically connect one of the optical fibers 424 to one of the optical fibers 426 when cables 416 and 420 are received in ports 410 and 414, respectively. In this way the electrical and optical paths in cabled-fiber 416 are separated from one another and directed to different ports.

Figure 5:
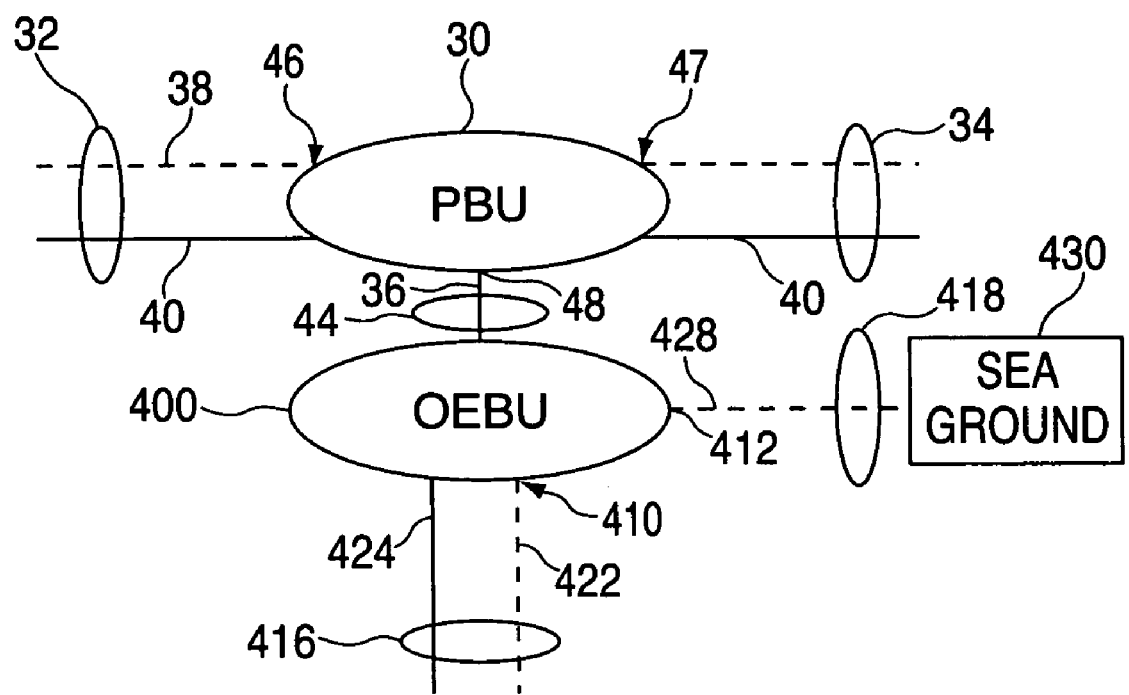
FIG. 5 shows the optical and electrical isolating unit of FIG. 4 interconnected with the branching unit depicted in FIG. 2.

FIG. 5 shows how the optical and electrical isolating unit 400 may be interconnected with the branching unit 30 depicted in FIG. 2 to collectively provide a branching unit in which all three legs are electrically powered. In FIGS. 2, 4 and 5 like elements are denoted by like reference numerals. As shown, cabled-fiber 44 located in port 48 of branching unit 30 is connected to cabled-fiber 426 located in port 414 of isolating unit 400 (see FIG. 4). That is, the unrepeatered cable branch of branching unit 30 is connected to the electrically unpowered port of the electrical isolating unit 400. The three cable legs 32, 34 and 416 are now all electrically powered and thus respectively correspond to cable legs 20, 22 and 24 associated with power switched branching unit 10 shown in FIG. 1. In this way cable legs 32 and 34 serve as cable trunks and cable leg 416 serves as a cable branch. The cable 418 that includes electrical conductor 428 but not optical fibers is sent to a sea ground 430. The sea ground 430 provides a means for safely coupling the electrical path to the seawater, and may, for example, simply consist of a large mass of a conducting metal. As shown below in connection with FIG. 6, the sea ground 430 allows the cable branch 416 to be powered from the branch terminal 113, while effectively electrically isolating the cable branch 416 from the cable trunks 32 and 34.

Figure 6:
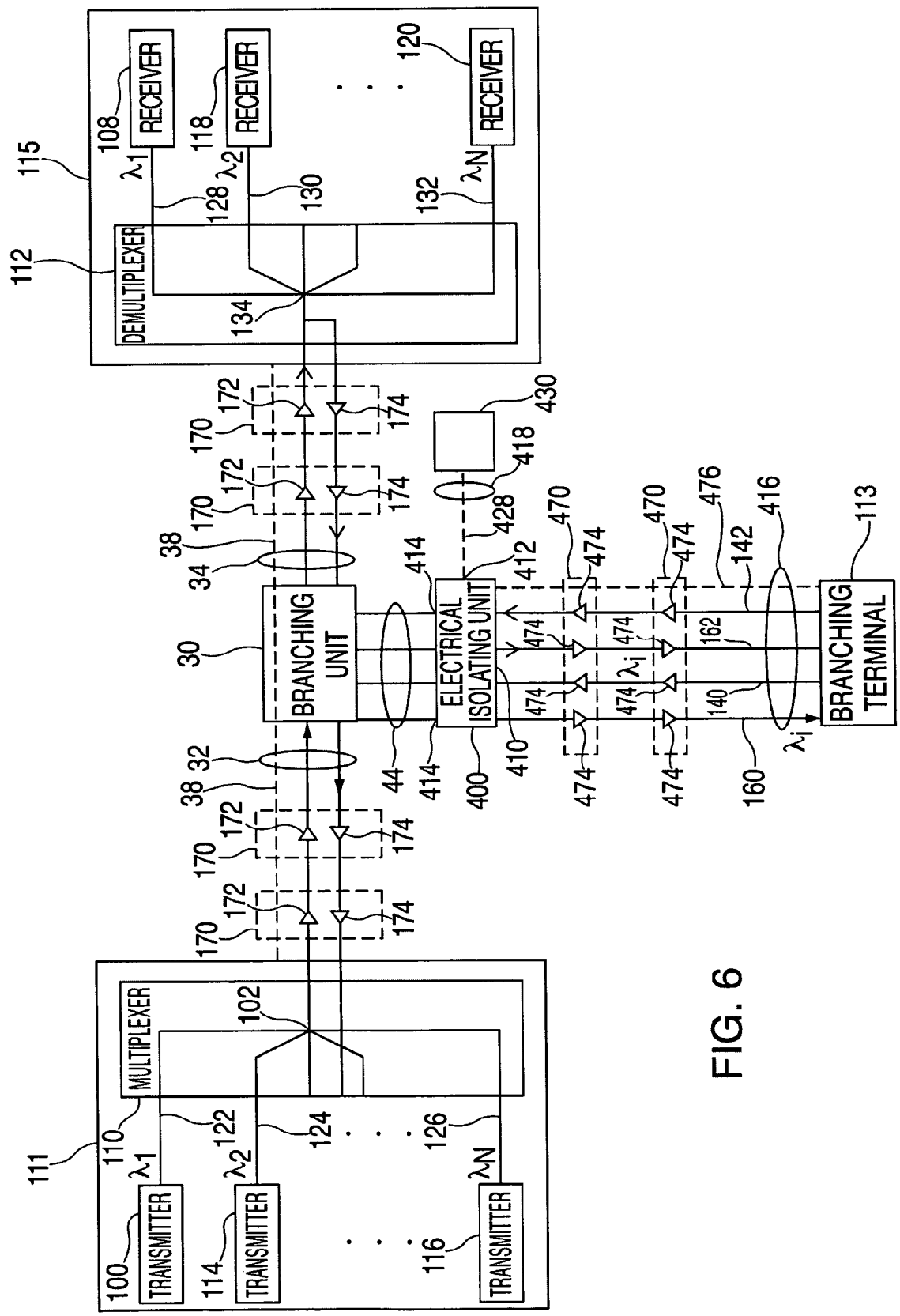
FIG. 6 shows a trunk and branch undersea WDM optical transmission system that employs the arrangement shown in FIG. 5.

In FIG. 6, branching unit 30 and optical and electrical isolating unit 400 serves as a branching unit in which all of its legs are electrically powered. Cabled-fiber 44 in FIG. 6 includes four optical fibers instead of the single optical fiber 36 shown in FIG. 5. Because electrical isolating unit 400 is employed, the cable branch 416 located between the electrical isolating unit 400 and branching terminal 113 may now include an electrical conductor 476. Thus, cable branch 416 may now include repeaters 470 to amplify the optical signals traversing optical fibers 160, 140, 162 and 142. The electrical conductor 476 is electrically coupled to sea ground 430 via the electrical conductor 428 connected to electrical isolating unit 400.

Figure 7:
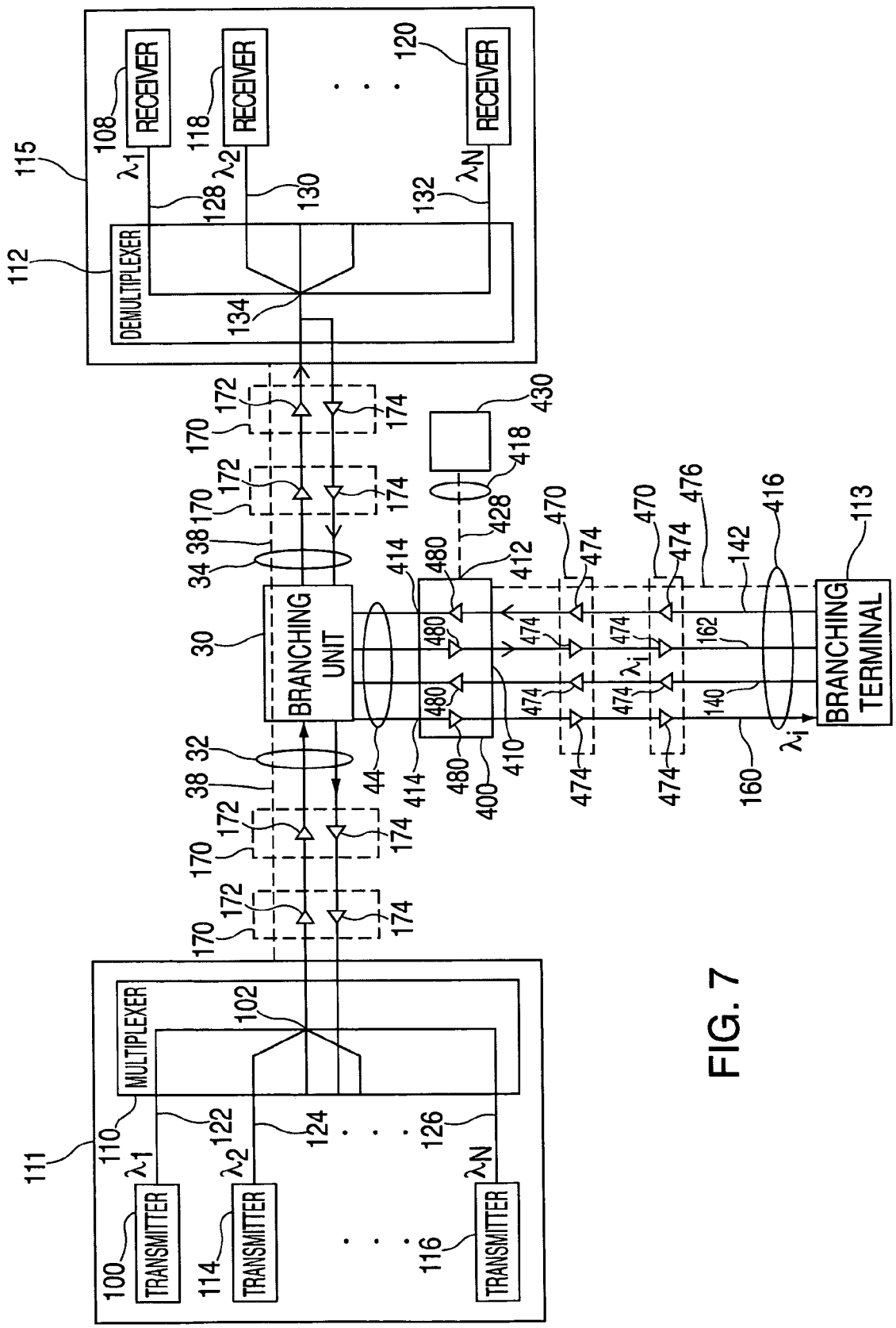
FIG. 7 shows an embodiment of an electrical isolating unit constructed in accordance with the present invention which incorporates optical amplifiers.

The embodiment of the electrical and optical isolating unit 400 seen in FIG. 6 simply serves as an electrical termination for the cable branch 416. In other embodiments of the invention it may be advantageous for the electrical isolating unit 400 to incorporate optical amplifiers so that in addition to serving as an electrical termination for the cable branch 416, the electrical isolating unit 400 also serves as a repeater. Such an electrical isolating unit 400 incorporating optical amplifiers 480 is shown in FIG. 7 The optical amplifiers 480 are each located in one of the optical fiber segments 432 (see FIG. 4) located in the optical and electrical isolating unit 400.

The invention claimed is:

1. A branching unit for interconnecting at least three undersea optical transmission cables, said branching unit comprising:
   a branching device including:
      a first pressure vessel adapted for use in an undersea environment;
      first and second ports located in the first pressure vessel for receiving first and second undersea, electrically powered, optical transmission cables;
      a third port located in the first pressure vessel for receiving a third, electrically unpowered, optical transmission cable;
   an optical and electrical isolating unit including:
      a second pressure vessel adapted for use in an undersea environment;
      fourth and fifth ports located in the second pressure vessel for receiving a fourth undersea, electrically powered, optical transmission cable and a fifth electrically powered transmission cable, respectively;
      a sixth port located in the second pressure vessel for receiving an end of said third, electrically unpowered optical transmission cable remote from the third port of the branching device;
      an electrical power conductor segment located in the second pressure vessel for electrically coupling an electrical power conductor in the fourth cable received in the fourth port to an electrical power conductor in the fifth cable received in the fifth port; and
      at least one optical fiber segment located in the second pressure vessel optically coupling at least one optical fiber of the third cable to at least one optical fiber of the fourth cable.

2. The branching unit of claim 1 further comprising at least one optical amplifier located along the at least one optical fiber segment for optically amplifying optical signals traveling therethrough.

3. The branching unit of claim 1 wherein said fourth cable includes at least one drop optical fiber and at least one add optical fiber.

4. The branching unit of claim 1 wherein said at least one optical fiber segment comprises a plurality of optical fiber segments each optically coupling an optical fiber of the third cable to an optical fiber of the fourth cable.

5. The branching unit of claim 4 further comprising a plurality of optical amplifiers each located along one of the plurality of optical fiber segments for optically amplifying optical signals traveling therethrough.

6. In an undersea optical transmission system that includes a plurality of land-based trunk terminals in optical communication with one another over at least first and second optical transmission trunk cables and a remotely located land-based branch terminal in optical communication with at least one of the trunk terminals over an optical transmission branch cable, a branching unit interconnecting the first and second trunk cables with the branch cable, said branching unit comprising:

a branching device including:

a first pressure vessel adapted for use in an undersea environment;

first and second ports located in the first pressure vessel receiving first and second undersea, electrically powered, optical transmission trunk cables;

a third port located in the first pressure vessel for receiving a third, electrically unpowered, optical transmission branch cable;

an optical and electrical isolating unit including:

a second pressure vessel adapted for use in an undersea environment;

fourth and fifth ports located in the second pressure vessel receiving a fourth undersea, electrically powered, optical transmission cable and a fifth electrically powered transmission cable, respectively;

a sixth port located in the second pressure vessel receiving an end of said third, electrically unpowered optical transmission branch cable he third port of the branching device;

an electrical power conductor segment located in the second pressure vessel for electrically coupling an electrical power conductor in the fourth cable received in the fourth port to an electrical power conductor in the fifth cable received in the fifth port; and at least one optical fiber segment located in the second pressure vessel optically coupling at least one optical fiber of the third cable to at least one optical fiber of the fourth cable.

7. The branching unit of claim 6 further comprising at least one optical amplifier located along the at least one optical fiber segment for optically amplifying optical signals traveling therethrough.

8. The branching unit of claim 6 wherein said fourth cable includes at least one drop optical fiber and at least one add optical fiber.

9. The branching unit of claim 6 wherein said at least one optical fiber segment comprises a plurality of optical fiber segments each optically coupling an optical fiber of the third cable to an optical fiber of the fourth cable.

10. The branching unit of claim 9 further comprising a plurality of optical amplifiers each located along one of the plurality of optical fiber segments for optically amplifying optical signals traveling therethrough.

* * * * *